A. L. HAFER.
CULTIVATOR ATTACHMENT.
APPLICATION FILED AUG. 21, 1913.
1,097,094.
Patented May 19, 1914.
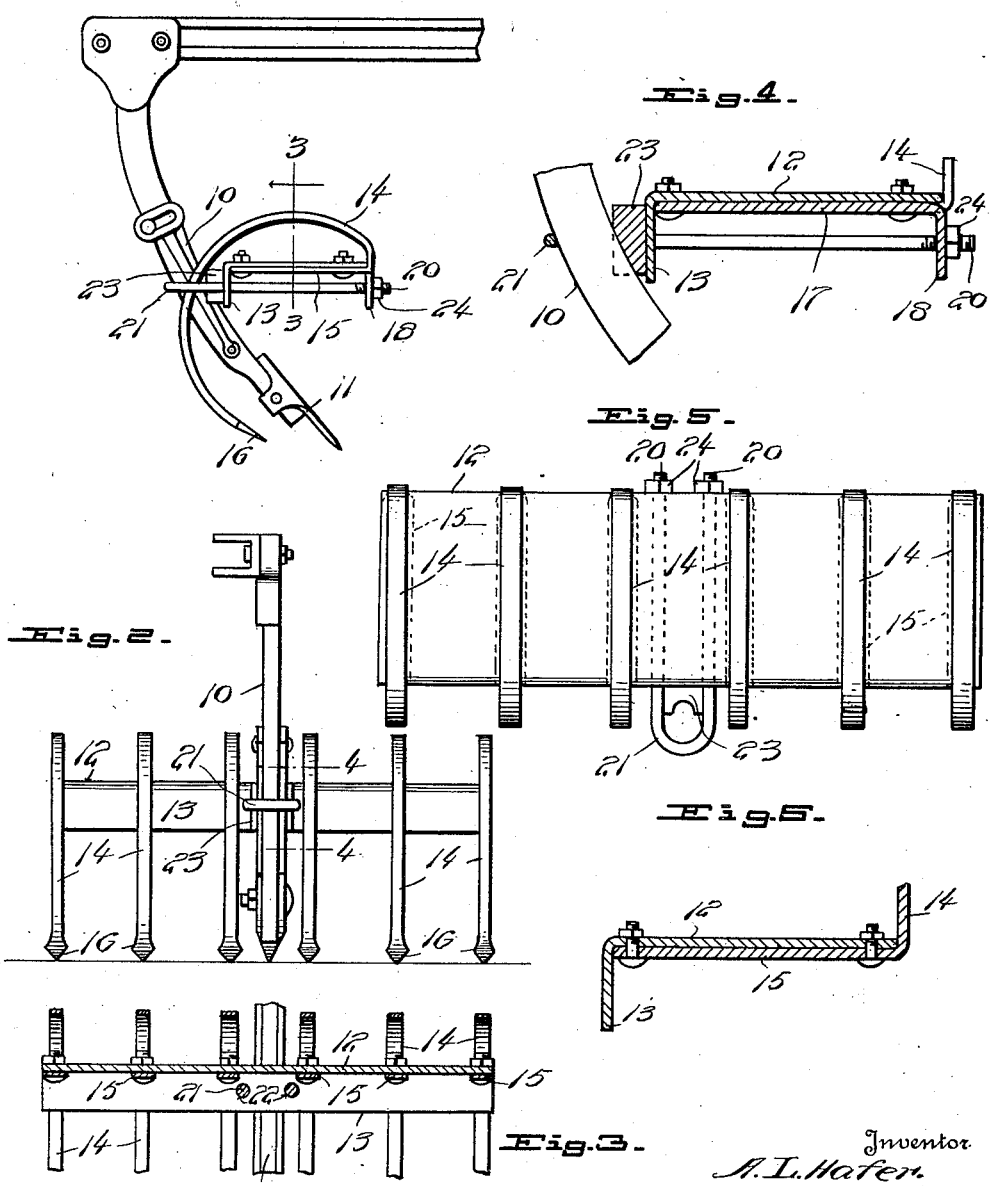

UNITED STATES PATENT OFFICE.

ALBERT L. HAFER, OF WESTFIELD, TEXAS.

CULTIVATOR ATTACHMENT.

1,097,094.   Specification of Letters Patent.   Patented May 19, 1914.

Application filed August 21, 1913. Serial No. 785,985.

*To all whom it may concern:*

Be it known that I, ALBERT L. HAFER, a citizen of the United States, residing at Westfield, in the county of Harris, State of Texas, have invented certain new and useful Improvements in Cultivator Attachments; and I do hereby declare the following to be a full, clear, and exact description of the invention, such as will enable others skilled in the art to which it appertains to make and use the same.

This invention relates to improvements in cultivating implements.

The principal object of the invention is to provide a simple harrowing attachment for the cultivator shovels, so that the soil can be pulverized immediately succeeding the lifting thereof by the cultivator shovel.

Other objects and advantages will be apparent from the following description, when taken in connection with the accompanying drawings.

In the drawings: Figure 1 is a side elevation of a portion of a cultivator showing my invention attached thereto. Fig. 2 is a rear elevation. Fig. 3 is a vertical longitudinal sectional view on the line 3—3 of Fig. 1. Fig. 4 is a vertical transverse sectional view on the line 4—4 of Fig. 2. Fig. 5 is a plan view of the attachment removed from the shovel. Fig. 6 is a sectional detail showing the manner of attaching the harrow teeth.

Referring particularly to the accompanying drawings, 10 represents the cultivator beam to which is attached the usual shovel 11, and in connection with which my harrow is particularly adapted.

My harrow comprises an elongated metal plate 12 which has one of its longitudinal marginal edges turned down as indicated at 13. Secured to the plate 12 at equally spaced distances are the curved spring harrow teeth 14, these teeth each having the attached end flattened as indicated at 15 and curved upwardly and rearwardly and then downwardly where it is provided with a digging blade or point 16. Secured centrally beneath the plate 12 and extending transversely thereof is a plate 17, this plate having its forward end 18 bent downwardly as clearly shown, this downwardly turned portion being formed with a pair of openings 22 to receive therethrough the threaded ends 20 of a U-bolt 21. This bolt 21 is first passed through openings 22 in the downturned edge 13. Secured to the downturned edge between the openings 22 is a concaved block 23. This block is arranged to engage the forward side of the beam of the cultivator shovel, and the curved connecting portion of the bolt to embrace the beam and draw the block thereagainst. The plate 12 is thus clamped to the beam and extends forwardly thereof, the teeth 14 engaging in the ground on both sides, and slightly in rear of the cultivator shovel. Thus the soil is dug up by the shovel and at the same time chopped or pulverized by the harrow teeth, these two operations being practically performed simultaneously. On the threaded ends of the bolt are placed nuts 24 which bear against the downturned portion 18 and draw the bolt tightly against the beam.

What is claimed is:

A harrow attachment for a cultivator shovel beam comprising an elongated transversely arranged angle plate, the downturned portion being provided with openings, a plate secured to the first named plate, and extending transversely thereof, said second plate having a downturned apertured portion, spring harrow teeth secured to the first named plate, a concaved block secured to the downturned portion of the first plate between the openings therein, said block being arranged to engage the forward side of the beam, and a U-shaped bolt embracing the beam and disposed through the openings of the before mentioned downturned portions.

In testimony whereof, I affix my signature, in the presence of two witnesses.

ALBERT L. HAFER.

Witnesses:
 GUSTAV KIESO,
 HENRY HOFFA.

Copies of this patent may be obtained for five cents each, by addressing the "Commissioner of Patents, Washington, D. C."